United States Patent [19]

Benson et al.

[11] Patent Number: 5,035,266
[45] Date of Patent: Jul. 30, 1991

[54] MECHANICAL PLUG FOR CLEAN-OUT TEES

[75] Inventors: Bryan R. Benson, North Branch; Marc P. Bevacco, New Hope, both of Minn.

[73] Assignee: Cherne Industries Incorporated, Minneapolis, Minn.

[21] Appl. No.: 451,012

[22] Filed: Dec. 11, 1989

[51] Int. Cl.⁵ .................... F16L 55/10; F16L 21/04
[52] U.S. Cl. ........................... 138/92; 138/89; 138/94; 220/233; 220/237; 277/102; 277/114; 4/295; 411/72
[58] Field of Search .................. 138/89, 90, 94, 92, 138/96 T; 220/233, 234, 235, 237, 24.5, 16; 411/44, 71, 72, 55, 34; 277/207 R, 213, 178, 114, 113, 102; 4/295

[56] References Cited

U.S. PATENT DOCUMENTS

| | | | |
|---|---|---|---|
| 2,324,545 | 7/1943 | Svirsky | 220/237 |
| 2,773,619 | 12/1956 | Moeller | 220/24.5 |
| 2,783,912 | 3/1957 | Hobbs | 220/16 |
| 2,855,003 | 10/1958 | Thaxton | 138/90 |
| 2,870,794 | 1/1959 | Thaxton | 138/90 |
| 2,974,685 | 3/1961 | Ver Nooy | 138/90 |
| 3,297,049 | 1/1967 | Moskovitz | 277/207 X |
| 3,509,918 | 5/1970 | Muzinich | 138/89 X |
| 3,613,936 | 10/1971 | Kaiser | 138/89 X |
| 3,618,811 | 11/1971 | Martino | 138/89 X |
| 3,661,291 | 5/1972 | Hetzer | 138/96 T |
| 3,667,640 | 6/1972 | Morrow | 138/89 X |
| 3,886,977 | 6/1975 | Dorgebray | 138/89 |
| 4,020,874 | 5/1977 | Palarino | 138/96 T |
| 4,188,675 | 2/1980 | Ast | 4/295 |
| 4,342,337 | 8/1982 | Underwood | 138/89 |
| 4,381,800 | 5/1983 | Leslie | 138/90 |
| 4,493,344 | 1/1985 | Mathison et al. | 138/89 |
| 4,817,671 | 4/1989 | Mathison et al. | 138/89 |

FOREIGN PATENT DOCUMENTS

| | | | |
|---|---|---|---|
| 714758 | 10/1954 | United Kingdom | 138/89 |
| 2161993 | 1/1986 | United Kingdom | 138/89 |

Primary Examiner—Stuart S. Levy
Assistant Examiner—Joseph A. Rhoa
Attorney, Agent, or Firm—Anthony G. Eggink

[57] ABSTRACT

A mechanical plug device for sealing pipeline access ports having a small threaded inner surface. The mechanical plug device has opposing inner and outer circular plate members. The rigid plate members each have interiorly tapered circumferential shoulders of generally the same predetermined slope. The inner plate member has an inner surface, an outer surface, a central aperture and a central cavity extending inward from the tapered circumferential shoulder. The outer circular plate member has an inner surface, an outer surface, a central aperture and an outwardly extending structure from the tapered circumferential shoulder for movement into the central cavity of the inner plate member. The device further has an elastomeric radially expandable pre-threaded O-ring structure which has an outer circumferential threaded surface configuration. The O-ring structure has a V-shaped bottom cross-section defining inclined surfaces of a predetermined slope. The device has an adjustable lateral force structure active between the inner and outer plate members to adjust and position the O-ring structure on their opposing circumferential shoulders.

14 Claims, 8 Drawing Sheets 5,035,266

MECHANICAL PLUG FOR CLEAN-OUT TEES

BACKGROUND OF THE INVENTION

This invention relates to mechanically operable plug devices for sealing pipelines or conduits. Particularly, this invention relates to mechanical plugs for sealing clean-out tees or access ports of low pressure pipelines or conduits.

Clean-out tees or access ports to pipelines are typically found in drain pipes, such as in basement floor drains, and also in horizontal or vertically disposed conduits which may require entry for cleaning or inspection purposes. These access ports or clean-out tees are typically circular structures extending perpendicularly from the pipeline. The ports usually have a relatively short length and are internally threaded to receive a threaded closure cap. After continued use, the access port threads often become damaged so that it is difficult or impossible to secure the threaded closure cap therein. Thus, the costly replacement of the damaged access port structure joined in the pipeline is often required.

The mechanical plug device of this invention permits the user to seal and plug the clean-out tees, particularly when slightly damaged. The device provides a stopping mechanism that seals clean-out tees and has a structure which can be quickly and effectively secured to seal the entry port. The plug device has a narrow or thin structural configuration which provides a flush sealing structure with the exterior of the entry port to diminish protruding obstacles and also flush within the interior of the pipeline to diminish flow obstruction.

In the past, various types of pipe plug devices have been proposed or utilized for sealing pipeline networks, such as sewer lines. For example, Applicants' assignees' U.S. Pat. No. 4,493,344, issued 15 January 1985, is for a mechanical plug device. The device of the '344 Patent is a hand operable device for temporarily sealing the interior of a pipeline. In contrast to the '344 structure, the more permanent and thinner mechanical plug for clean-out tees of this invention is specifically designed for use in threaded clean-out tees or access ports. Applicants' assignees' U.S. Pat. No. 4,817,671, issued 4 April 1989, is for a high pressure mechanical plug device for sealing and locking into a high interior pressure pipeline. In contrast to the '671 structure, the thinner mechanical plug of the present invention has structure for use in threaded access ports of low pressure pipelines.

Other prior art devices have also been proposed or utilized to seal pipelines and they primarily relate to either pneumatic or mechanical type plugs. With respect to the present invention, however, pneumatic plugs typically have a relatively larger body length and which utilize hollow rubber cylinders that are inserted into pipelines and then expanded by a fluid. Mechanical type plugs usually also have a relatively substantial thickness or width and which are typically constructed of plate structures which combine with various cooperating components to compress hollow rubber cylinders or sealing ring structures for expansion to contact and seal against the interior pipeline walls. These prior art devices have often been expensive to manufacture and have not provided a relatively thin, simple and economically constructed mechanical plug that is suitable for providing effective seals for pipe ends and, particularly, for threaded pipe access ports.

The mechanical plug for clean-out tees according to the teachings of this invention overcome the difficulties, limitations and other shortcomings of these prior art devices.

SUMMARY OF THE INVENTION

This invention provides a mechanical plug device for pipeline access ports having a small threaded inner surface. The mechanical plug device has opposing inner and outer circular plate members. The spacially opposing and parallel plate members have interiorly tapered circumferential shoulders of generally the same predetermined slope. The inner plate member further has an inner surface, an outer surface, a central aperture and a central cavity extending inward from the tapered circumferential shoulder. The outer plate member has an inner surface, an outer surface, a central aperture and an outwardly extending central structure from the tapered circumferential shoulder for movement into the central cavity of the inner plate member.

The mechanical plug device further comprises an elastomeric radially expandable O-ring structure which has an outer circumferential threaded surface configuration for sealing against the threaded inner surface of a pipeline access port. The O-ring structure has an inner circumferential generally V-shaped bottom cross-section defining inclined surfaces. The inclined surfaces have generally the same predetermined slope as the tapered shoulders of the opposing inner and outer plate members.

The mechanical plug device further has adjustable lateral force means extending through the central apertures of the inner and outer plate members. The positive adjustment of the lateral force means causes the circumferential shoulders of the opposed plate members to slidingly engage the inner circumferential inclined surfaces of the O-ring structure. This movement causes the O-ring to expand outwardly and seal its outer circumferential threaded surface against the inner surface of the pipeline access port.

The mechanical plug device further has antirotational means which are operative between the inner and outer plate members. The outer plate member further has a generally circular push-in cap structure for placement in the centrally disposed aperture and for covering the adjustable lateral force means. The inner and outer plate members are preferably of a unitary, molded plastic construction, and the O-ring member is constructed of specified deformable elastomeric materials.

These and other benefits of this invention will become clear from the following description by reference to the drawings.

DESCRIPTION OF THE PREFERRED EMBODIMENT

Figure 1:
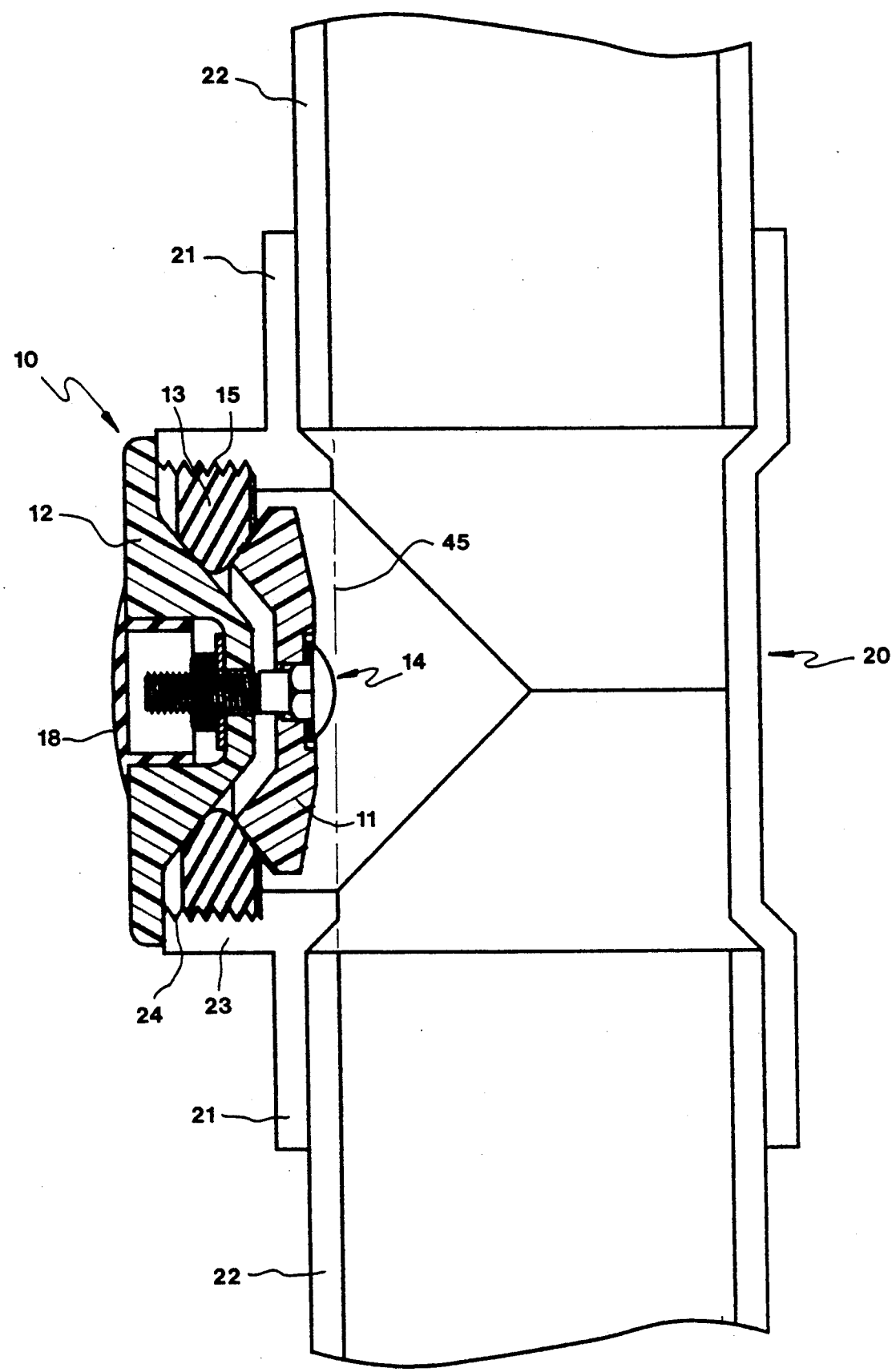
FIG. 1 is a lateral, cross-sectional view showing the mechanical plug for clean-out tees device and showing it in use in the entry port of a pipeline.
Figure 2:
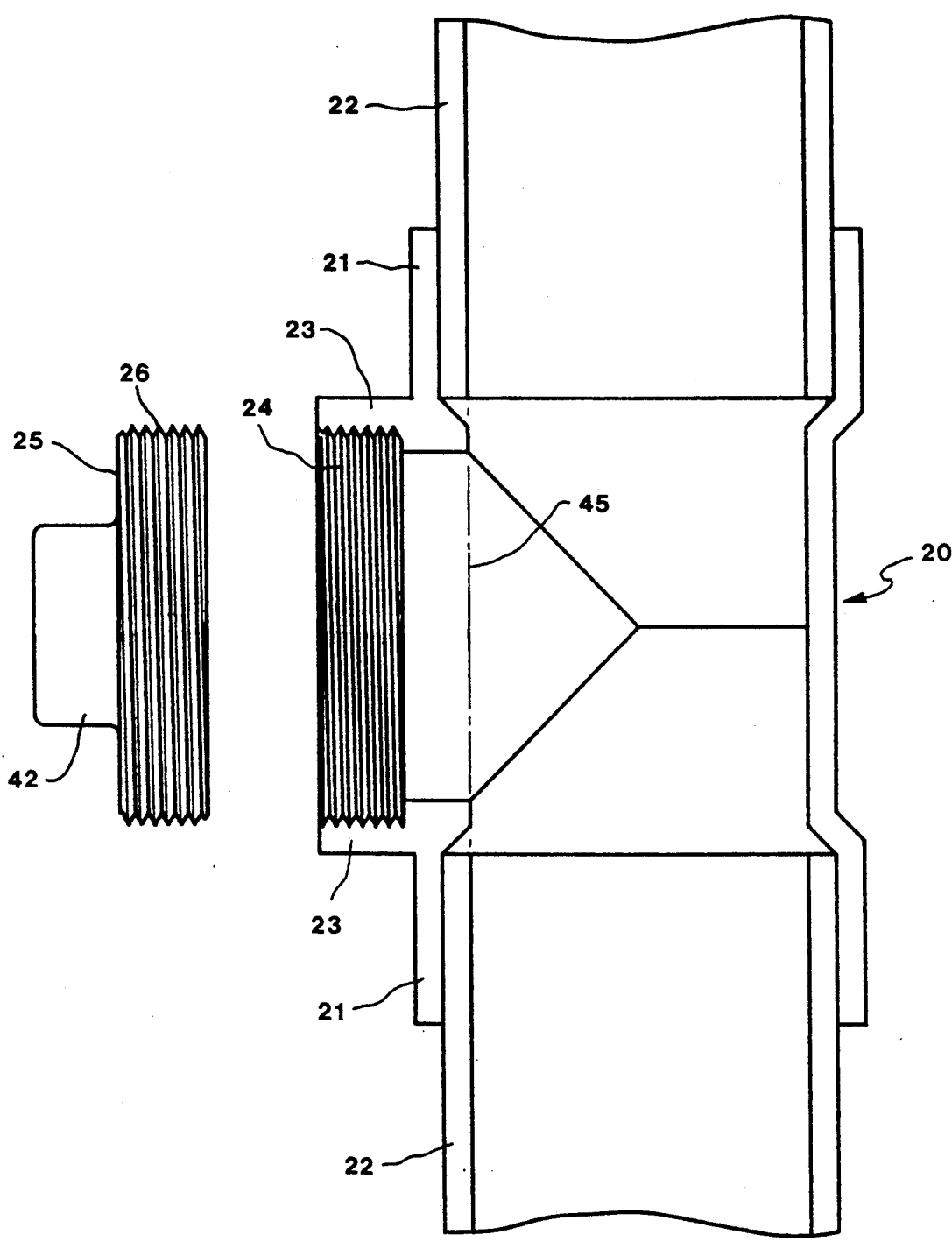
FIG. 2 is a top schematic view, partially in section, showing a pipeline and a typical clean-out tee for which the device of this invention is used.

Referring to FIGS. 1 and 2, a typical clean-out tee 20 is shown having connecting ends 21 that are joined in pipeline 22. The clean-out tee or entry port 20 has a top or lateral entry port 23 having interiorly disposed threads 24 and which normally receive the threads 26 of closure plug 25. Clean-out tees 20 of this nature are typically found in drain pipes, such as in basement floor drains. However, the mechanical plug device 10 of this invention is also useable in other horizontally or vertically disposed pipeline access ports which may require entry for inspection or cleaning purposes.

FIG. 2 is a top view of pipeline 22 having the clean-out tee 20 joined therein, as known in the art. The clean-out tee 20 has connecting ends 21 which are joined to the pipeline 22 and which has an outwardly extending entry port 23. Entry ports 23 typically have a short length and an internally threaded periphery 24 which receives plug 25 having threads 26 and a plug head 42 for manipulating the plug 25. The mechanical plug 10 of this invention is for use with clean-out tees 20 of this general configuration. Because the entry port 23 length is relatively short, prior art plugs are typically not suited for use in tee 20 structures and it is preferred that a plug device not extend appreciably beyond axis 45 or beyond the exterior of the entry port 23 so as to minimize obstacles on both ends of the entry port 23 to reduce fluid flow reduction or restriction within pipeline 22 and to minimize protrusions, as in a floor drain, for example.

The tee structure 20 is typically of a plastic or metallic construction. Plug devices according to the teachings of this invention are designed for use in low pressure pipelines, i.e., less than 5 p.s.i., and those having clean-out ports having a diameter range of one (1) to ten (10) inches although the teachings of this invention can be utilized for ports of other sizes and configurations. In the U.S., the thread designs typically found in clean-out tees are of the N.P.S. type (National Pipe Straight), however, the device can also be configured to seal access ports having other thread designs.

Figure 3:
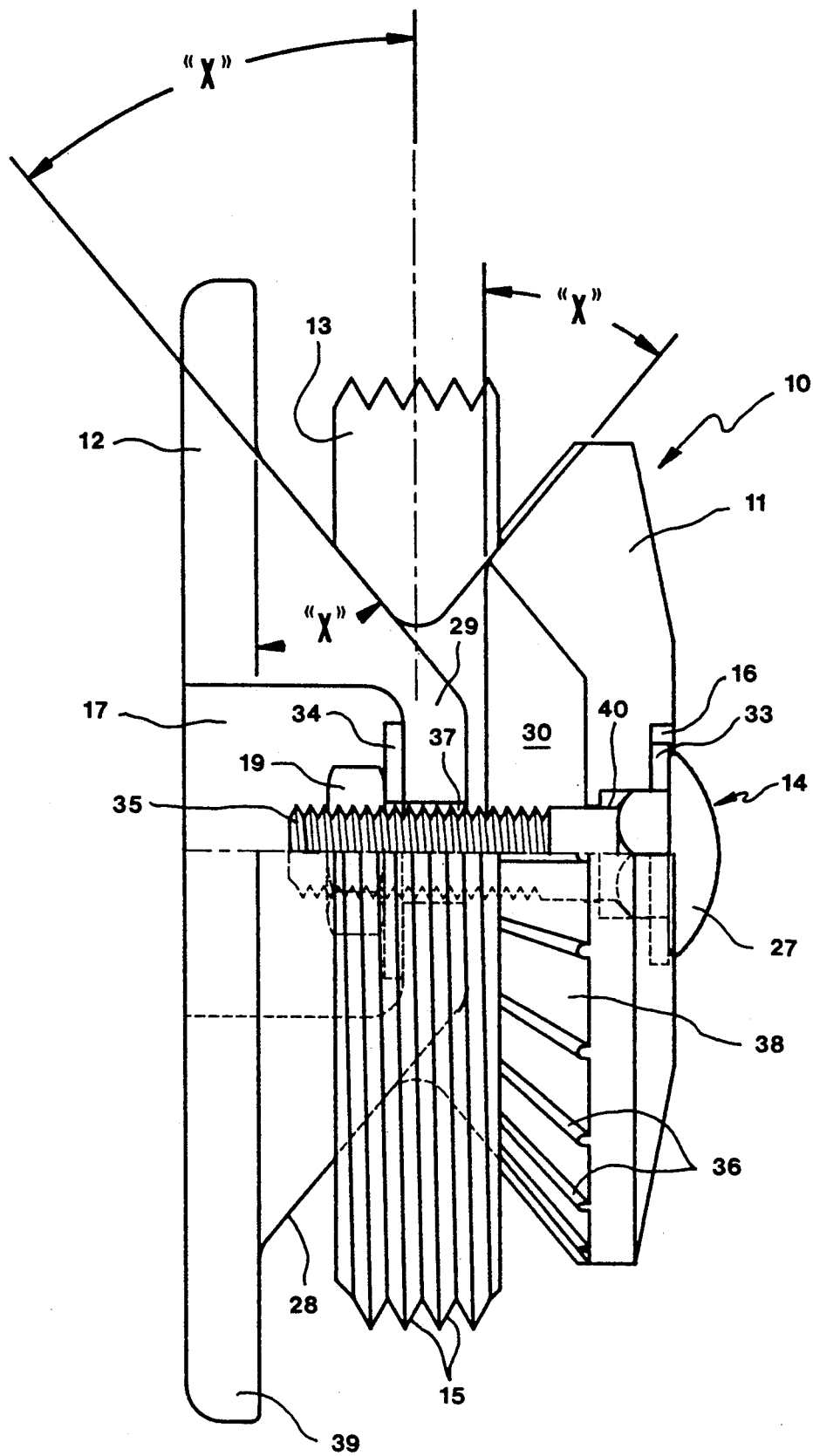
FIG. 3 is a lateral schematic view, partially in section, of the mechanical plug device according to the teachings of this invention.

FIGS. 1 and 3 show the mechanical plug 10 to have opposed exterior plate structures 11 and 12. Positioned between the opposed plates 11 and 12 is an elastomeric O-ring structure 13 which rest on shoulders 28 and 38 of the respective plates. An adjustable force means or tightening bolt and nut assembly 14 is provided to move the plates 11 and 12 toward each other to thereby expand the O-ring 13 for sealing against the interiorly disposed threads of the entry port 23. The lateral force imparting assembly 14 preferably has structure which prevents disassembly of the device. For example, the threaded bolt portion of 14 can have peened or flattened thread ends 35, a snap ring or like retaining means so that the nut 19 can no longer be unthreaded or removed from the bolt threads. This arrangement reduces the possibility of disassembly of the device during use.

The tightening bolt and nut assembly 14 is shown to have a washer 33, made of rubber or the like, positioned behind the bolt head in indentation 16 of plate member 11. The head of the threaded bolt 27 seats in the axial aperture 40 of plate member 11 and extends through the axial aperture 37 of the plate member 12 where the washer 34 and nut 19 are placed on the bolt threads within the cavity 17. The plate member 12 further is shown to have circumferential flange 39 which permits the device 10 to abut the entry port 23 in sealing engagement.

Figure 4:
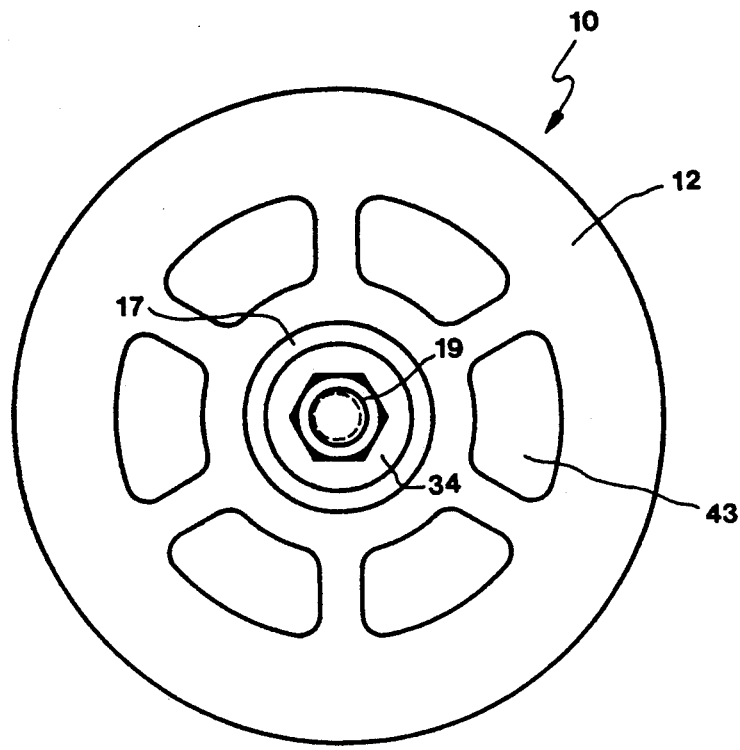
FIG. 4 is an end view of the mechanical plug device shown in FIG. 3 and showing a lateral plan view of the outer plate structure.
Figure 5:
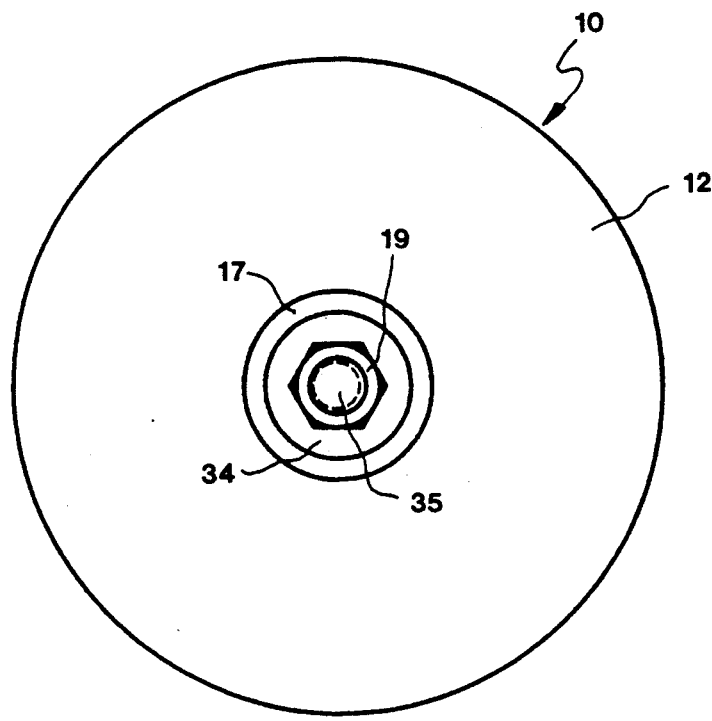
FIG. 5 is a lateral view of another embodiment of an outer plate structure.

As shown in FIGS. 4 and 5, the exterior of the outer plate members 12 can have several configurations. FIG. 4 shows an exterior plate configuration having a circular pattern of molded indentations 43. These molded indentations 43 lessen the amount of plastic materials utilized during the molding process, and they define the sloping interior ramp extension 29 and the shoulder 28 on the interior side of the plate member 12. These indentations 43 also aid in the molding process of the plate itself. Centrally and axially located in plate member 12 is a cavity 17 and a central aperture through which the bolt protrudes so that the nut 19 can be placed thereon. A washer 34 is shown so that the nut 19 is more easily manipulated onto the threaded bolt portion and to provide a fluid tight device structure. This configuration provides a device structure which has fewer potential obstacles and provides a smooth surface for the end of the entry port 23. As further shown, the cavities 17 in plates 12 have a nut 19 and a washer member 34, respectively, which are held in place by means of a peened bolt end 35 so that the device structure becomes unitary. Both configurations shown in FIGS. 4 and 5 are adapted to receive a push-in cap 18 as shown in FIG. 1 so that the cavity 17 is covered to provide a smooth surface for the exterior of the outer plate member 12. The removable push-in cap structure 18 provides a smooth outer surface for the device 10 as shown in FIG. 1 and which may be of a molded plastic or metal construction.

Figure 6:
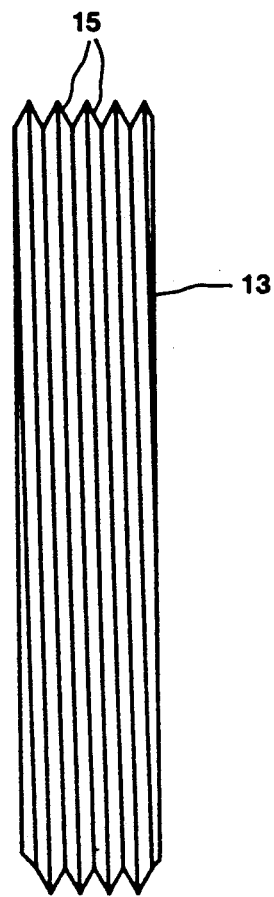
FIG. 6 is an end view of the O-ring structure of the mechanical plug device of this invention.

Importantly, as shown in FIG. 6, the O-ring structure 13 has a circumferential outside surface which has a threaded configuration 15. As further shown in FIG. 1, the mechanical plug 10 is positioned to seal the threaded port structure 23 of the clean-out tee 20. The surface threads 15 of the O-ring 13 are shown to engage the interior threads 24 of the entry port 23. The threaded exterior of the O-ring 13 preferably has a N.P.S. thread design or other threaded configuration to substantially match that of the interior clean-out tee threads.

As discussed, the mechanical plug device 10 is preferably constructed so that the elements of the tightening bolt and nut assembly 14 do not protrude beyond the respective outer surfaces of the plate structures 11 and 12. A push-in cap 18 is provided to engage the indentation 17 in outer plate 12. An indentation 16 in inner plate 11 is provided to receive the bolt head 27 of the assembly 14. This plug device configuration provides a mechanical plug that is generally flush with both the exterior and interior of the entry port or clean-out tee 23 after installation.

Figure 12:
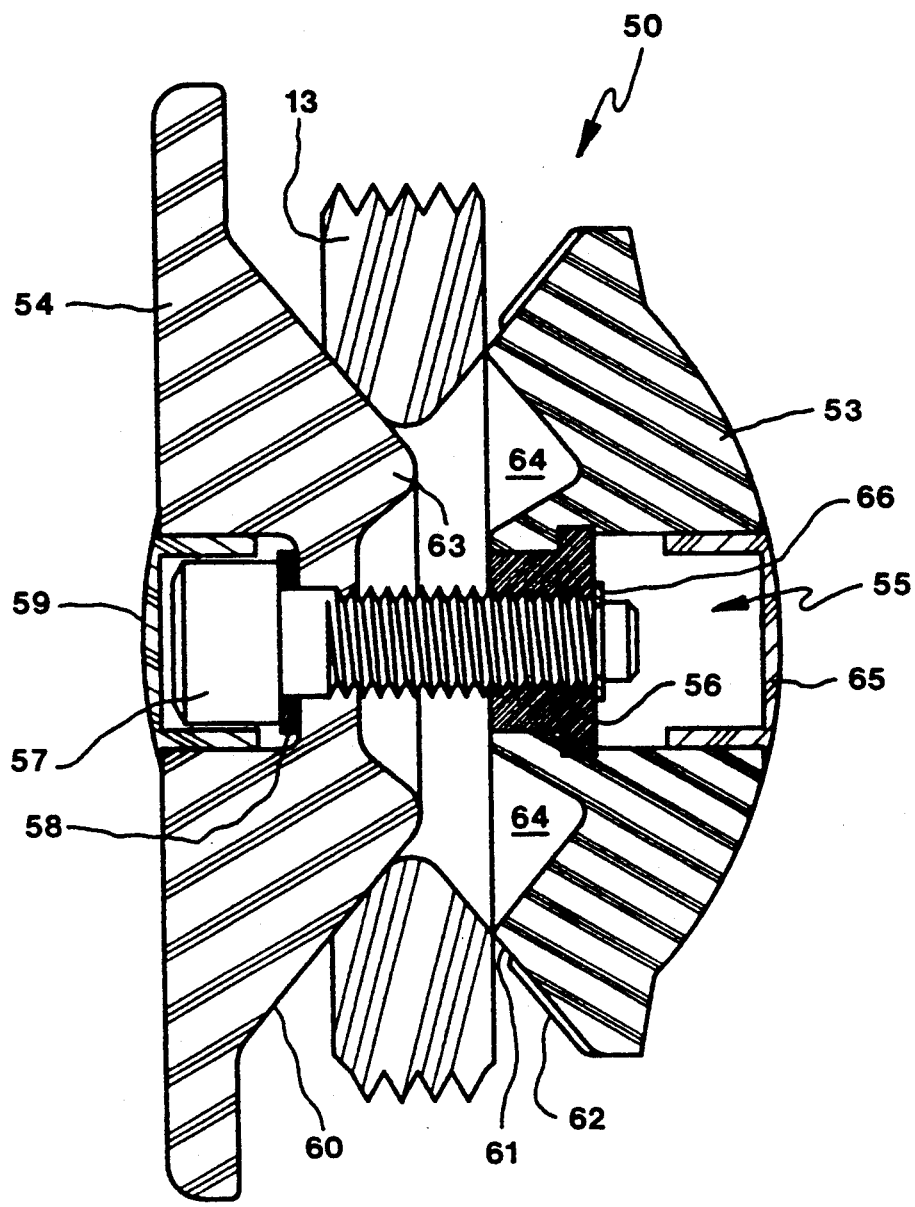
FIG. 12 is a lateral, cross-sectional view of another embodiment of the mechanical plug of this invention.

Importantly, the plug device 10 is designed to be as thin as possible. The cooperating plate structures 11 and 12 are shown in FIGS. 1, 3 and 12 to be dished or nested in the interior of the plug 10 structure so that the opposing plates move into each other during operation. Thus, as the assembly 14 is tightened, the inner ramps 28 of plates 11 and 12 push the O-ring 13 radially outward as the interior ramp extension 29 of plate 12 moves into the interior cavity 30 of plate structure 11. FIGS. 3 and 12 show the O-ring structures 13 in their relaxed or untightened state whereby one inclined surface of the O-ring rests on the relatively longer plate ramps 28 and 60, respectively, and the opposite upper inclined surface of the O-ring being approximately even with the bottom of the relatively shorter plate ramps 38 and 61, respectively. This cooperating ramp configuration provides a thin and flush plug device structure 10 for sealing the clean-out tee port 23. The thin or low profile plug device 10, therefore, provides a structure which minimizes any obstacles on the exterior of the pipeline entry port and which minimizes the possibility of fluid flow obstruction in the pipeline or conduit itself.

Figure 9:
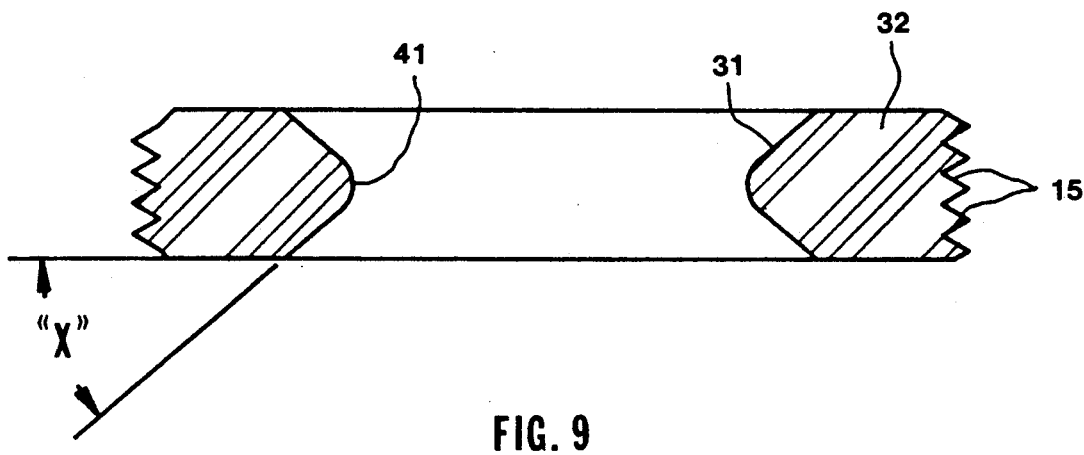
FIG. 9 is a cross-sectional view of the O-ring structure taken along lines 9—9 of FIG. 8.
Figure 10:
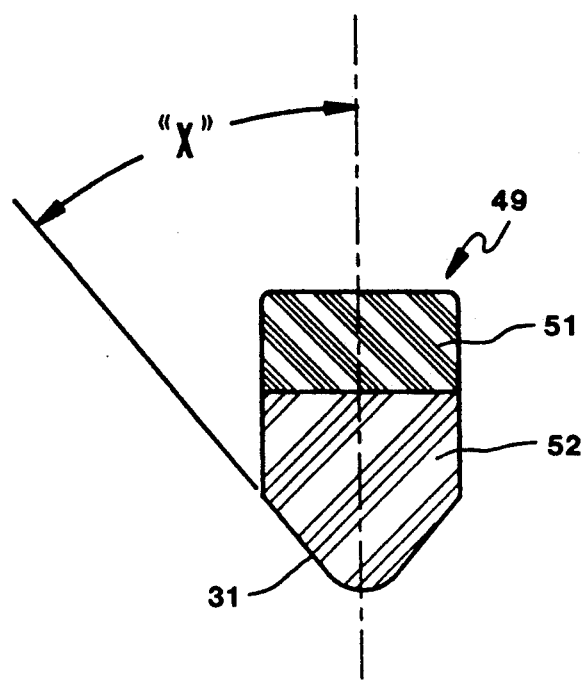
FIG. 10 is a cross-sectional view of an alternate embodiment of an O-ring structure for the device of this invention.
Figure 11:
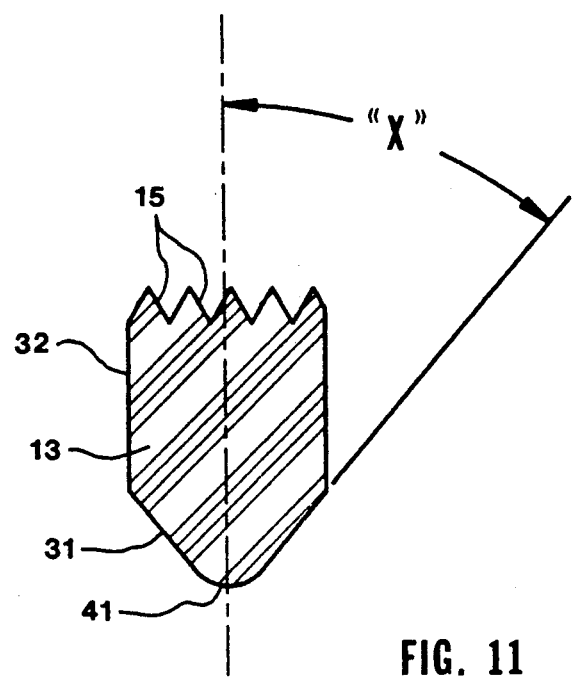
FIG. 11 is a cross-sectional view of the O-ring structure shown in FIGS. 7 and 8.

As shown in FIG. 3, the plate structures 11 and 12 are shown to have opposing and interiorly disposed ramp or shoulder structures 28 and 38, respectively. The ramp structures 28 and 38 preferably have a predetermined slope or angle "X" ranging from 35 to 50 degrees. Preferably, this angle is approximately 40 degrees for most entry port diameters. As also shown in FIGS. 9-11, the O-ring structure 13 has a V-shaped bottom portion defined by sloping bottom shoulders 31 terminating into a rounded apex 41. The shoulders 31 are shown to have the same angle "X" and have the same angle range as that of the plate ramps or shoulders 28, and they functionally cooperate with them. This configuration has been found to yield a cooperating structure which permits the O-ring 13 to slide on the respective plate ramps 28 and 38 as the tightening bolt and nut assembly 14 is used. Thus, the combination of these elements permits maximum expansion of the O-ring with minimum travel of the bolt and nut assembly 14.

As shown in FIGS. 6, 8, 9 and 11, the O-ring 13 has lateral side portions 32 and shoulders 31 forming a V-shaped cross-sectional bottom portion and terminating into an apex 41. The O-ring structure 13 is preferably constructed of a deformable elastomeric materials, having a durometer A reading ranging between 45-75, and being preferably constructed of plasticized polyvinylchloride, natural rubber, synthetic rubber, urethane, or neoprene. Further, the inner and outer plate members 11 and 12 are preferably of a unitary molded plastic construction, i.e., of ABS, nylon or the like, depending upon environmental and performance requirements. The plastic plate construction is preferred for manufacturing economy and they provide an anti-corrosion plug structure. The molded plates 11 and 12 may also be reinforced by fiberglass or carbon fibers to provide added structural strength.

Figure 7:
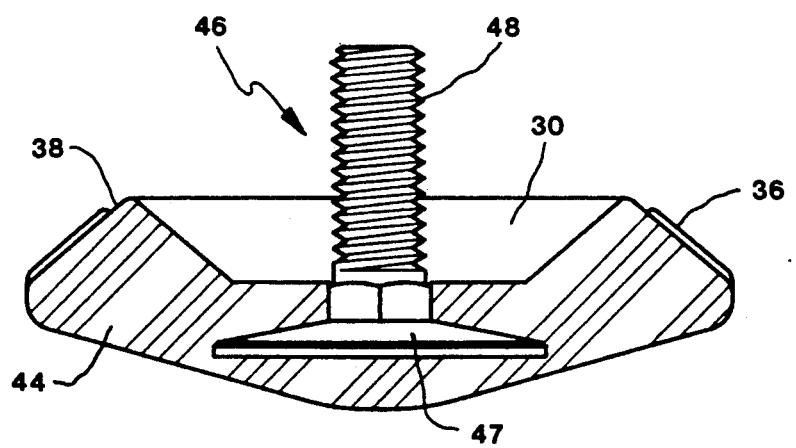
FIG. 7 is a lateral plan view of another embodiment of an inner plate structure of the mechanical plug device of this invention.
Figure 8:
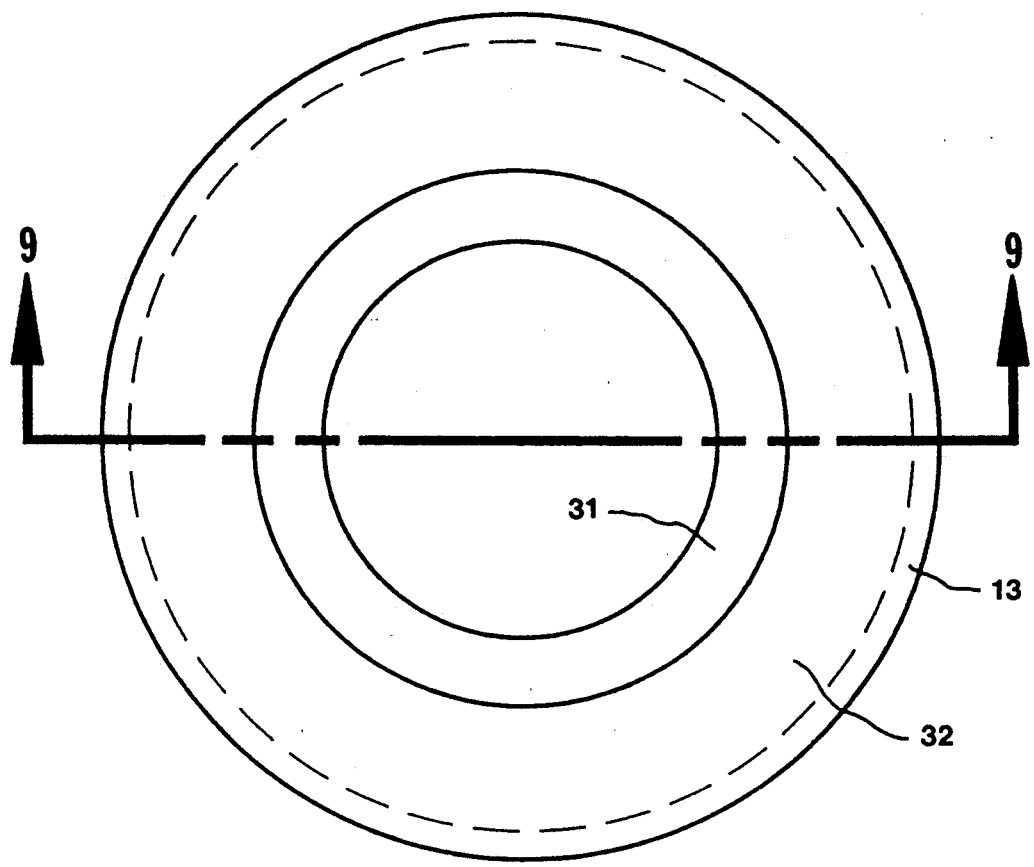
FIG. 8 is a lateral plan view of the O-ring structure shown in FIG. 6.

FIG. 7 shows an alternate embodiment of the inner plate member 44 wherein a bolt structure 46 is embedded therein. As shown, the head member 47 of the bolt structure is molded into the inner plate structure to provide a unitary plate structure. This plate configuration provides a fluid tight unitary structure between the plate member and the lateral force means. The inner plate member 44 further has an interior cavity 30, a plate ramp or shoulder 38 and anti-rotational ribs 36 placed thereon. Extending axially through the interior cavity 30 is the threaded shaft 48 which extends through the central aperture of the outer plate member 12.

FIG. 10 shows an alternate O-ring structure 49. The cross-sectional view shown shows the O-ring member 49 to have an outer layer 51 and an inner shell or layer 52. The outer layer 51 is preferably of a relatively softer elastomeric material having a Shore A durometer reading ranging between 30-45, while the inner shell 52 is of a relatively harder configuration having a Shore A durometer reading ranging between 55-75. This composite O-ring structure allows the O-ring 49 to be utilized without the threaded exterior 15 because the softer outer layer 51 is adapted to seal into the thread cavities. Thus, the O-ring structure 49 may be utilized in the various mechanical plug embodiments of this invention. The shoulders 31 of the O-ring member are shown to have an angle "X" to cooperate with the opposing plate ramps.

FIG. 12 shows an alternate plug embodiment 50 having an inner plate structure 53 and an outer plate structure 54. A lateral force means 55 is shown having an internally threaded insert 56 placed axially in the inner plate member 53. The threaded insert 56 receives bolt 57 which is manipulated through the central cavity in the outer plate 54. A snap ring 66 is shown at the end of the threaded bolt 57 so that the device 50 structure maintains a unitary configuration during use. The snap ring 66 or other retaining means known in the art may also be utilized for the device structure 10 of FIG. 3 wherein a peened bolt end 35 is utilized.

An insert cap 65 is provided for the inner plate member 53 after the threaded insert 56 is molded or otherwise placed therein. The insert cap 65 is provided for a seal tight configuration for the inner plate member 53. The outer plate member 54 further has a circumferentially disposed ramp extension 63 which defines the plate ramp 60 and which is adapted to protrude into the circumferential inner cavity 64 of the inner plate member 53. The lateral force means 55 further has a washer 58 for the threaded bolt 57. An insert cap 59 is further provided for the central cavity of the outer plate member 54. Thus, as the threaded bolt 57 is turned, the O-ring structure 13 is slid onto the respective plate shoulder or ramps 60 and 61 to radially push the O-ring structure against the interior of the conduit inner surface. Ramp ribs 62 are provided on the plate ramp 61 so that a gripping relationship is provided with the O-ring structure 13 during manipulation of the lateral force means 55.

In summary, the mechanical plug embodiments of this invention are low profile or thin structures for sealing threaded conduit access ports. The plug structures utilize opposing plate members having interiorly disposed circumferential ramps or shoulders which engage the O-ring structure having a cooperating V-shaped bottom cross-sectional configuration. Importantly, the exterior circumferential surface of the O-ring has structure to sealingly engage the threaded interior of the access port and the opposing ramps or shoulders have different lengths and cross-sectional configurations to permit internal plate nesting to provide the desired low profile device structure of this invention.

As many changes are possible to the embodiments of this invention, utilizing the teachings thereof, the description above and the accompanying drawings should be interpreted in the illustrative and not in the limited sense.

That which is claimed is:

1. A mechanical plug device for pipeline access ports having a small threaded inner surface, said mechanical plug device comprising:
   (a) spacially opposing inner and outer rigid circular plate members having opposing interiorly tapered circumferential shoulders of generally the same predetermined slope, said inner plate member further having an outer surface and a central cavity extending inward from said tapered circumferential shoulder, and said outer plate member further having an outer surface and an inner surface having an outwardly extending central structure from said tapered circumferential shoulder for movement into said central cavity of said inner plate member, said circumferential shoulder of said outer plate having a radial length longer than the radial circumferential shoulder length of said inner plate,
   (b) an elastomeric radially expandable O-ring structure having an outer circumferential surface of a prethreaded configuration to substantially match the threaded inner surface of a pipeline access port, said O-ring structure further having an inner circumferential generally V-shaped bottom cross-section defining inclined surfaces, said inclined surfaces having generally the same said predetermined slope as said tapered shoulders of said opposing inner and outer plate members, and
   (c) adjustable lateral force means operative between said inner and outer plate members, whereby the positive adjustment of said lateral force means causes said opposed plate member circumferential shoulders to slidingly engage said O-ring inclined surface structure to cause said O-ring outer circumferential surface to seal against the threaded inner surface of the access port.

2. The mechanical plug device of claim 1, wherein said adjustable force means is comprised of a threaded bolt and nut structure and wherein said threaded bolt is embedded in said inner plate member.

3. The mechanical plug device of claim 1, wherein said device has means to resist rotational movement between said inner and outer plate members.

4. The mechanical plug device of claim 3, wherein said anti-rotational means is comprised of said sloped shoulder of said inner plate member having at least one radially extending anti-rotational rib structure extending therefrom for contact with said O-ring structure.

5. The mechanical plug device of claim 1, wherein said predetermined slopes of said inner and outer plate members and said V-shaped inclined surfaces of said expandable O-ring member are in a range of 35 to 50 degrees as measured vertically in cross section.

6. The mechanical plug device of claim 1, wherein said predetermined slopes of said inner and outer plate members and said V-shaped inclined surfaces of said expandable O-ring member is approximately 40 degrees as measured vertically in cross section.

7. The mechanical plug device of claim 1, wherein said inner and outer plates have axial apertures aligned therethrough and where said inner plate is slotted about said aperture into said exterior surface and wherein said adjustable force means consists of a threaded bolt and nut structure, and wherein said bolt further has a head portion for non-rotationally engaging said slotted aperture of said inner plate member.

8. The mechanical plug device of 7, wherein a sealing washer member is disposed between said bolt head and said inner plate member and wherein a washer member having a low coefficient of friction is disposed between said nut and said outer plate member, whereby said sealing washer member further provides a fluid tight plug device and whereby said low frictional washer aids the tightening and untightening process of said nut onto the threaded portion of the bolt.

9. The mechanical plug device of claim 1, wherein said outer plate member has a unitary radially extending flange member for abutting the end of the conduit entry port.

10. The mechanical plug device of claim 1, wherein said outer plate member has an axial central cavity in said outer surface and a cooperating removable circular push-in cap structure for insertion in said cavity for covering said adjustable lateral force means and to provide a flush plug exterior.

11. The mechanical plug device of claim 1, wherein said inner and outer plate members are of a unitary, molded plastic construction, and wherein said O-ring member is of a deformable elastomeric materials selected from a group of materials consisting of plasticized polyvinylchloride, natural rubber, synthetic rubber, neoprene and urethane.

12. A mechanical plug for clean-out tees for sealing against the interior threaded surface of the entry port of a pipeline, said device comprising:
   (a) a narrow, elastomeric racially expandable O-ring structure having an outer circumferential surface for engaging the interior threaded surface of a conduit entry port, and an inner circumferential V-shaped bottom cross-section having inclined surfaces of a predetermined slope ranging from 35 to 50 degrees as measured vertically in cross-section, said outer circumferential O-ring surface further having a prethreaded exterior configuration,
   (b) spacially opposing circular inner and outer plate members of a unitary, rigid and molded plastic construction, said plate members having axial apertures and interiorly facing tapered shoulders of generally the same said predetermined slope as said O-ring and being constructed and arranged to engage the inclined surfaces of said O-ring, said inner plate member further having an outer surface, an inner surface and having a central cavity extending inward from said tapered circumferential shoulder, and said outer plate member further having an outer surface and an inner surface having an outwardly extending central structure from said tapered circumferential shoulder for movement into said central cavity of said inner plate member, said circumferential shoulder of said outer plate having a radial length longer than the radial circumferential shoulder length of said inner plate, said outer plate member further having a circumferential flange member for abutting the end of the conduit entry port, said outer plate member further having an axial cavity in said outer surface and a cooperating removable push-in cap structure, and
   (c) adjustable force means operable through said axial apertures of said opposing plate members, whereby subsequent to the placement of the plug device into a pipeline entry port, the positive adjustment of said lateral force means causes said sloped opposing shoulders of said plate members to move towards each other to impart lateral forces to the O-ring inclined surfaces to cause said O-ring to seal said threaded circumferential surface against the threaded interior of the entry port.

13. The mechanical plug device of claim 12, wherein said O-ring member is of a deformable elastomeric materials selected from a group of materials consisting of plasticized polyvinyl chloride, natural rubber, synthetic rubber, neoprene and urethane.

14. The mechanical plug device of claim 12, wherein said inner plate member has an exterior axially aligned indentation for receiving said lateral force means and to provide a flush exterior configuration therefor.

* * * * *